UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS OF SEPARATING POTASSIUM AND ALUMINUM FROM THEIR SILICATE COMBINATIONS.

1,129,505.   Specification of Letters Patent.   Patented Feb. 23, 1915.

No Drawing.   Application filed July 8, 1912. Serial No. 708,277.

*To all whom it may concern:*

Be it known that I, SAMUEL PEACOCK, a citizen of the United States, residing at Chicago, in the county of Cook and State of Illinois, have invented certain new and useful Improvements in Processes of Separating Potassium and Aluminum from Their Silicate Combinations; and I do hereby declare the following to be a full, clear, and exact description of the invention, such as will enable others skilled in the art to which it appertains to make and use the same.

This invention relates to a process of separating potassium and aluminum from their silicate combinations, while at the same time producing carbids and nitrids of these metals which may be utilized in the production of other compounds.

This invention has for its object the attainment of the above results in a simple, expeditious and comparatively inexpensive manner, and to these ends consists in the novel steps constituting my process, all as will be more fully hereinafter disclosed and particularly pointed out in the claims.

In carrying out my process I finely divide a potassium bearing silicate rock such as a natural ortho-clase or microcline, having a formula such as $KAlSi_3O_8$, and mix the same with a suitable quantity of finely divided carbon such as ground coke, coal dust or other form of fuel carbon. The mixed carbon and silicate is then heated to a temperature of about 1200° C. to 1400° C. in an atmosphere containing substantially no free oxygen, when it is found that potassium and aluminum are separated in the form of decomposition products of the normal carbids $K_2C_2$ and $Al_2C_3$. That is to say these higher carbids dissociate into the lower carbids, such as $K_2C$ and $Al_4C_3$, respectively. The reactions which take place may be stated as follows:—

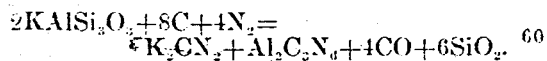

If the reaction is carried out in an atmosphere of nitrogen, free from air, then the potassium and aluminum are separated as nitrids such as $K_3N$ and $Al_2N_2$, respectively; or as carbo-nitrids such as $K_2CN_2$ and $Al_2C_3N_6$, respectively; or as a mixture of these compounds together with some of the above carbids. In this case, however, the temperature should be raised to between 1600° C. and 1800° C. The latter reactions which take place may be described as follows:

While potassium and aluminum silicates are decomposed at the temperatures and under the conditions stated, the velocity of the reaction is greatly increased by raising the temperature to say 1600° C. in the first instance and to 2000° C. in the second example. Further, the decomposition of the silicate is greatly facilitated by maintaining low partial pressures of the products of the reaction. This may be accomplished by carrying out the process in a gas tight furnace through which the mixture is continuously fed, while nitrogen is admitted at the discharge end and continuously drawn through and out of the furnace at the feed end; a vacuum pump at the feed end of the furnace being used to maintain the partial pressures at the desired values. But I prefer to maintain low partial pressures by simply flushing the furnace at intervals during the process either with nitrogen, or with an inert or neutral gas such as hydrogen, or even with ordinary fuel or illuminating gas.

I am not as yet able to say with certainty just what atomic linkages are involved in the products actually produced, but from the presence of combined carbon and combined nitrogen (when nitrogen is present in the furnace), and from other considerations, I believe the normal valencies persist, and that the above compounds are the ones produced in the greatest quantities although there may be others present in smaller proportions. That is to say, the products found in the furnace seem to be limited to the following:—carbon monoxid, CO; potassium carbid, $K_2C$; aluminum carbid, $Al_2C_3$; potassium nitrid, $K_3N$; aluminum nitrid, $Al_2N_2$; potassium carbo-nitrid, $K_2CN_2$; aluminum nitrid, $Al_2C_3N_6$; and silica, $SiO_2$. When the temperature is high and the partial pressures kept low by flushing with nitrogen gas, most of the furnace products are found to be carbon monoxid, CO, and the above nitrids, carbo-nitrids and silica.

It will be observed from the foregoing that at the comparatively low temperatures mentioned I am enabled to separate out from its associated compounds the potassium and aluminum in silicates and to drive them off in the form of carbids. These gaseous compounds may next be burned with an excess of air in any suitable apparatus to form potassium carbonate $K_2CO_3$, and aluminum oxid, $Al_2O_3$.

When the metallic nitrids are present in sufficient quantity to render the recovery of their nitrogen profitable, they may be transferred from the furnace to an autoclave and treated with superheated steam at a pressure of say not less than five atmospheres, when the following reactions take place:—

$$Al_2N_2+3H_2O=Al_2O_3+2NH_3$$
$$2K_3N+3H_2O=3K_2O+2NH_3$$

On the other hand when the metallic carbo-nitrids are present in sufficient quantity to render the recovery of their combined nitrogen desirable, they may be likewise placed in an autoclave, and treated with superheated steam as above, when the following reactions will take place:—

$$K_2CN_2+3H_2O=K_2CO_3+2NH_3$$
$$Al_2C_3N_6+9H_2O=Al_2O_3+3CO_2+6NH_3$$

In treating the furnace products with superheated steam, any metallic carbids that might be present will break up as follows:—

$$2K_2C+2H_2O=2K_2O+C_2H_4$$
$$2Al_2C_3+6H_2O=2Al_2O_3+3C_2H_4$$

In the step of treating the furnace products with superheated steam the velocity of the reaction may be controlled by regulating the pressure of the steam. At five atmospheres pressure the reaction velocity is rather slow; as the pressure and therefore the temperature increases, however, the reaction velocity increases in accordance with well known thermodynamic laws.

It is obvious that those skilled in the art may vary the details of my process without departing from the spirit thereof, and therefore I do not wish to be limited to the above disclosure except as may be required by the claims.

This application differs from my co-pending application entitled Process of decomposing natural silicates filed Aug. 8, 1913 No. 708,274 in that said co-pending application is directed to the production of metallic carbo-nitrids such as the potassium and aluminum carbo-nitrids, from which ammonia can also be made. In this application, on the other hand, the temperature is not carried high enough to produce such carbo-nitrids, in quantity, but only sufficiently high to produce carbids, and incidently, small proportions of nitrids. In other words, the temperature used in this application is so low as not to require electric heat, the process being carried out at the temperatures furnished by the combustion of ordinary fuel.

What I claim is:—

1. The process of releasing potassium and aluminum from their silicate combinations and forming carbids which consists in heating a silicate containing said metals in the presence of carbon and in an atmosphere devoid of free oxygen to a temperature above 1200° C., substantially as described.

2. The process of releasing potassium and aluminum from their silicate combinations and forming carbids of said metals which consists in heating a silicate containing said metals in the presence of carbon and in an atmosphere devoid of free oxygen to a temperature substantially between 1200° C. and 1400° C., substantially as described.

3. The process of releasing potassium and aluminum from their silicate combinations which consists in heating a silicate containing said metals in an atmosphere of nitrogen and in the presence of carbon to a temperature above 1200° C., substantially as described.

4. The process of releasing potassium and aluminum from their silicate combinations which consists in heating a silicate containing said metals in an atmosphere of nitrogen substantially devoid of free oxygen and in the presence of carbon to a temperature above 1200° C., while reducing below the normal the partial pressures of the reaction products, substantially as described.

In testimony whereof, I affix my signature, in presence of two witnesses.

SAMUEL PEACOCK.

Witnesses:
D. S. TOVELL,
R. S. CHILTON.